United States Patent
Wu et al.

(10) Patent No.: US 11,321,590 B2
(45) Date of Patent: May 3, 2022

(54) TRAINING METHOD AND SYSTEM OF OBJECTS DETECTION MODEL BASED ON ADAPTIVE ANNOTATION DESIGN

(71) Applicant: INDUSTRIAL TECHNOLOGY RESEARCH INSTITUTE, Hsinchu (TW)

(72) Inventors: Po-Yi Wu, Taipei (TW); Ming-Shan Deng, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 49 days.

(21) Appl. No.: 16/904,161

(22) Filed: Jun. 17, 2020

(65) Prior Publication Data

US 2021/0201086 A1    Jul. 1, 2021

(30) Foreign Application Priority Data

Dec. 31, 2019    (TW) ................................ 108148497

(51) Int. Cl.
    *G06K 9/62* (2022.01)
    *G06V 10/20* (2022.01)

(52) U.S. Cl.
    CPC ......... *G06K 9/6263* (2013.01); *G06V 10/255* (2022.01)

(58) Field of Classification Search
    CPC ... G06K 9/6263; G06K 9/6256; G06V 10/255
    See application file for complete search history.

(56) References Cited

U.S. PATENT DOCUMENTS

| 9,767,381 B2 | 9/2017 | Rodriquez-Serrano et al. |
| 2017/0147905 A1 | 5/2017 | Huang et al. |
| 2019/0266491 A1 | 8/2019 | Gao et al. |

(Continued)

FOREIGN PATENT DOCUMENTS

| CN | 106204468 A | 12/2016 |
| CN | 106709568 A | 5/2017 |
| CN | 107909566 A | 4/2018 |

(Continued)

OTHER PUBLICATIONS

Taiwanese Office Action and Search Report for Taiwanese Application No. 108148497, dated Jul. 6, 2020.

*Primary Examiner* — John W Lee
(74) *Attorney, Agent, or Firm* — Birch, Stewart, Kolasch & Birch, LLP

(57) ABSTRACT

A training system and method of object detection model is disclosed. The training system includes an object detection model and a loss calculation module. The object detection model is configured to generate an output image according to an input image. The loss calculation module, coupled to the object detection model, is configured to calculate a total classification loss value according to the output image and a solution image, calculate a loss value according to the total classification loss value, and transmit the loss value to the object detection model. The total classification loss value is calculated according to a number of classification losses corresponding to a number of object types. Each classification loss corresponding to each object type is calculated according to a first parameter, a second parameter and a third parameter.

20 Claims, 5 Drawing Sheets

(56) References Cited

U.S. PATENT DOCUMENTS

2020/0311986 A1\* 10/2020 Tong .................... G06N 3/0472
2021/0064934 A1\* 3/2021 Swaminathan ........ G06K 9/627

FOREIGN PATENT DOCUMENTS

| CN | 109271852 A | 1/2019 |
| CN | 109559300 A | 4/2019 |
| CN | 109639377 A | 4/2019 |
| CN | 109886359 A | 6/2019 |
| TW | I612433 B | 1/2018 |
| TW | 201816669 A | 5/2018 |
| TW | 201944283 A | 11/2019 |
| WO | WO 2018/051841 A1 | 3/2018 |

\* cited by examiner

TRAINING METHOD AND SYSTEM OF OBJECTS DETECTION MODEL BASED ON ADAPTIVE ANNOTATION DESIGN

This application claims the benefit of Taiwan application Serial No. 108148497, filed Dec. 31, 2019, the disclosure of which is incorporated by reference herein in its entirety.

TECHNICAL FIELD

The disclosure relates in general to a training method of object detection model and system based on adaptive annotation.

BACKGROUND

Artificial intelligence (AI) has been widely used in object recognition of image in many fields. To establish an operable recognition model based on AI, normally a large volume of annotated images are needed for training the recognition model. In some fields which require higher expertise, annotated images are mostly generated through manual annotation. The AI developers always find it difficult to modify the manually annotated images provided by the professionals. For example, medical images are normally manually annotated by professional doctors. Since the time cost of manual annotation done by professional doctors is much higher than that done by time workers, it is hard to ask the doctors to annotate the images with the annotation box of accurate size. On the other hand, due to the high respect for the professionals in the medical field, normally the user will not adjust or change the annotation box after receiving the manually annotated images from the doctors. Therefore, the existing technologies find it difficult to train the recognition model to achieve high efficiency by using the above manually annotated images which are barely modified.

SUMMARY

According to one embodiment, a training system of object detection model is disclosed. The training system includes an object detection model and a loss calculation module. The object detection model is configured to generate an output image according to an input image. The loss calculation module, coupled to the object detection model, is configured to calculate a total classification loss value according to the output image and a solution image, calculate a loss value according to the total classification loss value, and transmit the loss value to the object detection model. The total classification loss value is calculated according to a number of classification losses corresponding to a number of object types. Each classification loss corresponding to each object type is calculated according to a first parameter, a second parameter and a third parameter. The first parameter corresponds to a penalty mark determined according to whether one or more annotation boxes belonging to the object type in the output image box-select one or more objects which should be determined as the object type. The second parameter corresponds to a threshold value for determining whether the one or more annotation boxes belonging to the object type in the output image box-select one or more objects belonging to the object type. The third parameter corresponds to a mark weighted value determined according to whether the one or more annotation boxes belonging to the object type in the output image box-select one or more objects not belonging to the object type.

According to another embodiment, a training method of object detection model. The training method includes: providing an input image to the object detection model, such that the object detection model is enabled to generate an output image according to the input image; calculating a total classification loss value by a loss calculation module according to the output image and a solution image; calculating a loss value by the loss calculation module according to the total classification loss value; and transmitting the loss value to the object detection model by the loss calculation module. The total classification loss value is calculated according to a number of classification losses corresponding to a number of object types. Each classification loss corresponding to each object type is calculated according to a first parameter, a second parameter and a third parameter. The first parameter corresponds to a penalty mark determined according to whether one or more annotation boxes belonging to the object type in the output image box-select one or more objects which should be determined as the object type. The second parameter corresponds to a threshold value for determining whether the one or more annotation boxes belonging to the object type in the output image box-select one or more objects belonging to the object type. The third parameter corresponds to a mark weighted value determined according to whether the one or more annotation boxes belonging to the object type in the output image box-select one or more objects not belonging to the object type.

According to an alternative embodiment, a training system of object detection model is disclosed. The training system includes an object detection model, a first loss calculation module and a second loss calculation module. The object detection model includes a first sub-model and a second sub-model. The first sub-model is configured to generate a first output image according to an input image. The second sub-model is configured to generate a second output image according to the first output image. The first loss calculation module, coupled to the first sub-model, is configured to calculate a first total classification loss value according to the first output image and a solution image, calculate a first loss value according to the first total classification loss value, and transmit the first loss value to the first sub-model. The second loss calculation module, coupled to the second sub-model, is configured to calculate a second total classification loss value according to the second output image and the solution image, calculate a second loss value according to the second total classification loss value, and transmit the second loss value to the second sub-model. The first total classification loss value is calculated according to a number of first classification losses corresponding to a number of object types. Each first classification loss corresponding to each object type is calculated according to a first parameter and a second parameter. The second total classification loss value is calculated according to a number of second classification losses corresponding to the object types. Each second classification loss corresponding to each object type is calculated according to a third parameter. The first parameter corresponds to a penalty mark determined according to whether one or more annotation boxes belonging to the object type in the first output image box-select one or more objects which should be determined as the object type. The second parameter corresponds to a threshold value for determining whether the one or more annotation boxes belonging to the object type in the first output image box-select one or more objects belonging to the object type. The third parameter corresponds to a mark weighted value determined according to whether the one or more annotation boxes belonging to the object type in the second output image box-select one or more objects not belonging to the object type.

According to another alternative embodiment, a training method of object detection model is disclosed. The training method includes: providing a first sub-model an input image to the object detection model, such that the first sub-model is enabled to generate an output image according to the input image; calculating a first total classification loss value by a first loss calculation module according to the first output image and a solution image; calculating a first loss value by the first loss calculation module according to the first total classification loss value; transmitting the first loss value to the first sub-model by the first loss calculation module; generating a second output image by a second sub-model of the object detection model according to the first output image; calculating a second total classification loss value by a second loss calculation module according to the second output image and the solution image; calculating a second loss value by the second loss calculation module according to the second total classification loss value; and transmitting the second loss value to the second sub-model by the second loss calculation module. The first total classification loss value is calculated according to a number of first classification losses corresponding to a number of object types. Each first classification loss corresponding to each object type is calculated according to a first parameter and a second parameter. The second total classification loss value is calculated according to a number of second classification losses corresponding to the object types. Each second classification loss corresponding to each object type is calculated according to a third parameter. The first parameter corresponds to a penalty mark determined according to whether one or more annotation boxes belonging to the object type in the first output image box-select one or more objects which should be determined as the object type. The second parameter corresponds to a threshold value for determining whether the one or more annotation boxes belonging to the object type in the first output image box-select one or more objects belonging to the object type. The third parameter corresponds to a mark weighted value determined according to whether the one or more annotation boxes belonging to the object type in the second output image box-select one or more objects not belonging to the object type.

The above and other aspects of the disclosure will become better understood with regard to the following detailed description of the preferred but non-limiting embodiment (s). The following description is made with reference to the accompanying drawings.

Figure 1A:
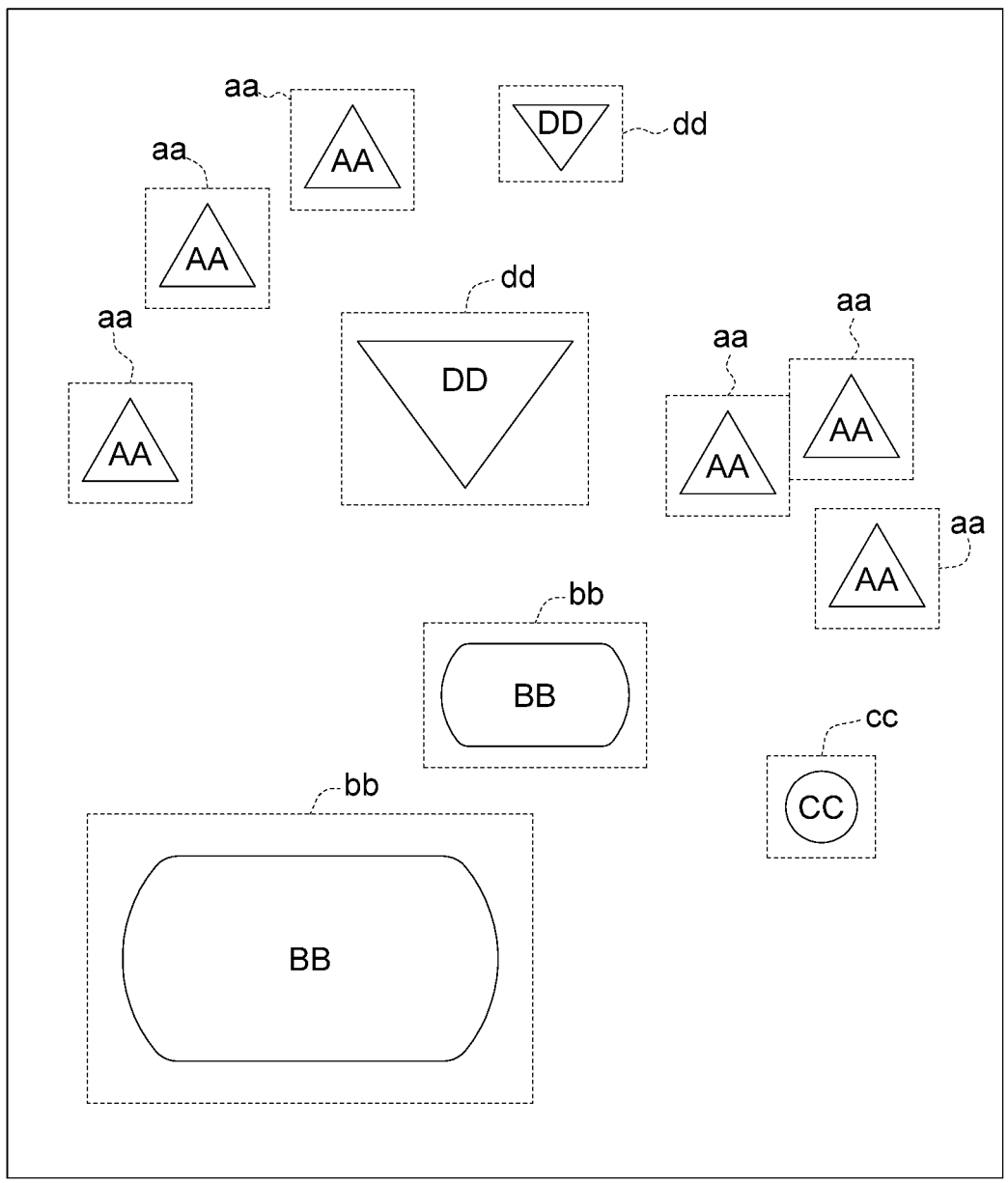
FIG. 1A is a schematic diagram of an ideal annotated image.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

For the disclosure of the present disclosure to be more easily understood, the embodiments below are exemplified by medical images. It should be noted that the present disclosure could be used in the situation that the ground truth, that is, the solution image for training purpose, cannot be modified or is not suitable for modification, and the application of the present disclosure is not limited to medical images.

Figure 1B:
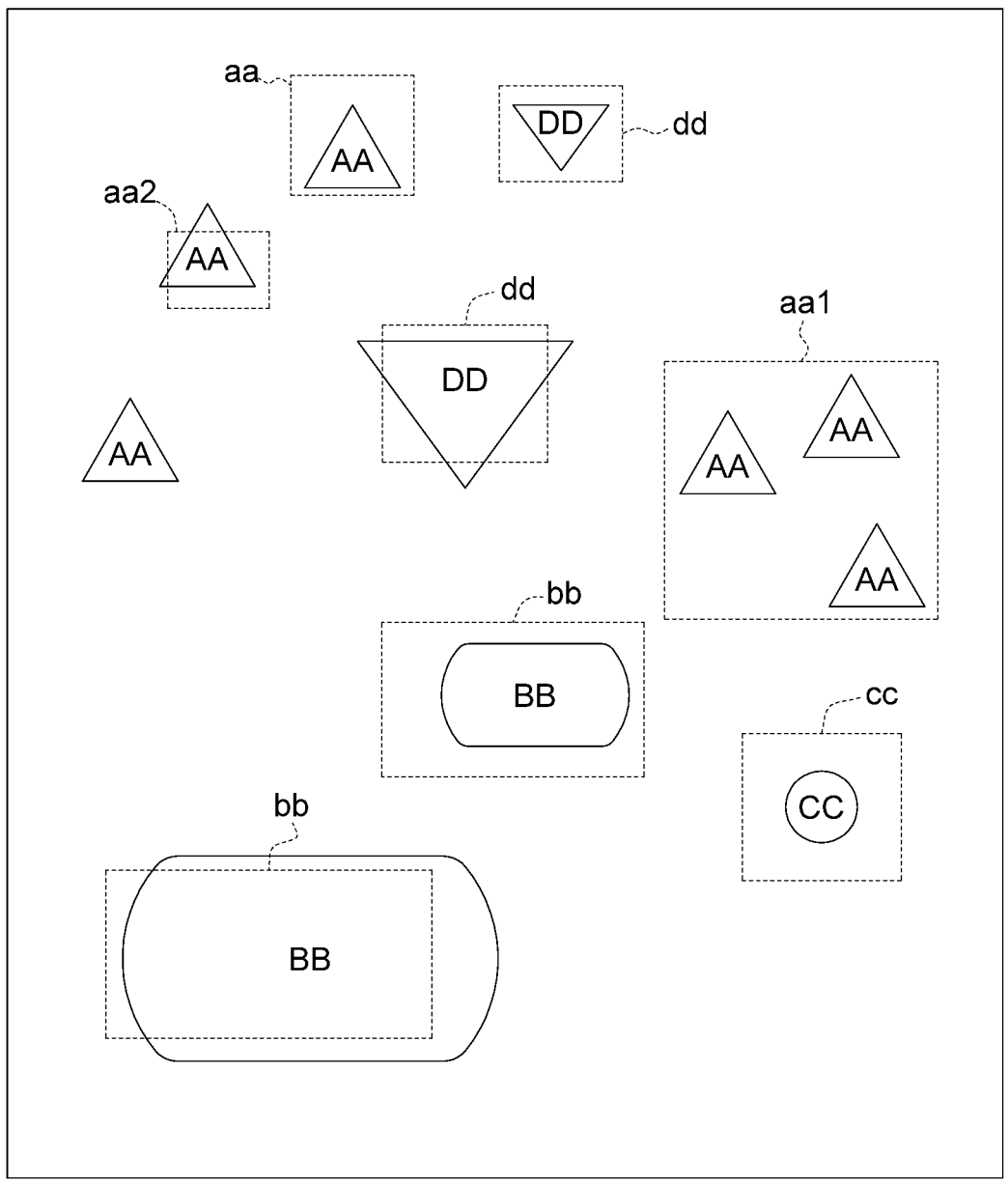
FIG. 1B is a schematic diagram of an actual annotated image.

Refer to FIGS. 1A and 1B. FIG. 1A is a schematic diagram of an ideal annotated image. FIG. 1B is a schematic diagram of an actual annotated image. Before the embodiments of the present disclosure are disclosed, a schematic diagram of an ideal annotated image and a schematic diagram of an actual annotated image are used to explain the problems faced by existing technologies.

In FIGS. 1A and 1B, AA represents a first object; BB represents a second object; CC represents a third object; and DD represents a fourth object; aa, aa1, aa2 are annotation boxes used to annotate the first symptom; bb is an annotation box used to annotate the second symptom; cc is an annotation box used to annotate the third symptom; and dd is an annotation box used to annotate the fourth symptom. A comparison between FIG. 1A and FIG. 1B shows that actual annotated image has the following problems:

(1) Incorrect annotations: symptoms may appear in clusters, and the doctor may annotate a number of identical symptoms with one annotation box (for example, the three first objects AA at the right-hand side of FIG. 1B are annotated with only one annotation box aa1).

(2) Displacement of annotation boxes: when the symptom has a small size, the annotation box annotated by the doctor may not be tightly fit to the symptom or may not completely enclose the symptom (for example, at the top left corner of FIG. 1B, the annotation box aa2 configured to annotate the first symptom does not completely enclose the first object AA).

(3) Missing annotations: when the number of similar symptoms is too large, the doctor may only annotate some of the similar symptoms (for example, the first object AA at the left-hand side of FIG. 1B is not annotated in any annotation box).

In addition to the problems illustrated in FIGS. 1A and 1B, actual annotated image still has another problem, that is, (4) determination of similar symptoms may vary from person to person: different doctors may have different determinations for the same symptom. In actual situation, normally more than a thousand of annotated images are needed for training purpose and are provided by many professional doctors, therefore the criteria for determining the symptoms may not be consistent. For example, suppose the third object CC of FIG. 1A is similar to the first object AA in terms of performance. Most doctors annotate the third object CC with the annotation box cc, but few doctors annotate it with the annotation box aa. That is, most doctors determine the third object CC as the third symptom, but few doctor determine it as the first symptom.

The training method and system disclosed in the present disclosure are capable of reducing the negative influence generated during the training of the object detection model.

Figure 2:
FIG. 2 is a block diagram of a training system of object detection model according to an embodiment of the present disclosure.

Referring to FIG. 2, a block diagram of a training system of object detection model according to an embodiment of the present disclosure is shown. The training system 20 includes an object detection model 10 and a loss calculation module 90.

The object detection model 10 could be realized by a one-stage neural network architecture, and could implement an algorithm through a combination of computer readable instructions to detect and classify objects. In an embodiment, the object detection model 10 could adopt various adaptable object detection models of existing technologies. In another embodiment, the object detection model 10 also could adopt various modified object detection models of existing technologies. In other words, the present disclosure does not have specific restrictions regarding the object detection model 10. The object detection model 10 is configured to generate an output image IMG-out according to an input image IMG-in. The input image IMG-in may include a number of objects, such as the objects not enclosed by annotation boxes in FIG. 1A, that is, original medical images. The object detection model 10 detects the objects in the input image IMG-in by using an algorithm, and annotates the detected objects with annotation boxes, each including an object type configured to indicate the object type of the box-selected object to generate an output image IMG-out.

The loss calculation module 90, coupled to the object detection model 10, could be realized by a combination of computer readable instructions. The loss calculation module 90 is configured to receive the output image IMG-out and a solution image IMG-sol, and calculate a loss value Loss according to the output image IMG-out, the solution image IMG-sol and a loss function. The solution image IMG-sol corresponds to the input image IMG-in. The solution image IMG-sol is an annotated input image IMG-in, and could be regarded as the ground truth of the annotated input image IMG-in. In an embodiment, the solution image IMG-sol could be a medical image manually annotated by a doctor. Such image may have negative influence in the training of the object detection model 10 (that is, the training stage) due to the problems (1)-(4) described above. The loss calculation module 90 transmits the loss value to the object detection model 10. The object detection model 10 may adjust one or more parameters of the object detection model 10 according to the loss value to increase the accuracy in symptom detection. Details of the loss function and the loss value are disclosed below.

In an embodiment, the object detection model 10 and the loss calculation module 90 could be stored in a memory, and could be performed by a processor. The output image IMG-out outputted from the object detection model 10 performed by the processor could be stored in the memory. When the processor performs the loss calculation module 90, the processor could read the output image IMG-out from the memory, and could store the calculated loss value to the memory.

In an embodiment, the loss value is calculated according to a total classification loss value and a total regulation loss value. The loss function could be represented by a mathematic formula:

$$Loss = \sum_{i=1}^{L} Loss_{cls-i} + \sum_{i=1}^{L} Loss_{reg-i},$$

wherein Loss represents a loss value; $Loss_{cls-i}$ represents a classification loss corresponding to the object type i; $Loss_{reg-i}$ represents a regulation loss corresponding to the object type i; and L represents the number of object types. That is, the total classification loss value is obtained by adding up the classification loss of all object types; and the total regulation loss value is obtained by adding up the regulation loss of all object types. The total classification loss value represents the degree of difference between the object types of the objects in annotated the output image IMG-out and the solution image IMG-sol. The total regulation loss value represents the degree of difference between the locations, sizes or object types (the present disclosure is not limited thereto) of the annotation boxes included in the output image IMG-out and the solution image IMG-sol. The present disclosure mainly improves the method for calculating the classification loss. The regulation loss could be calculated according to any available functions, such as usable functions of existing technologies, and the present disclosure does not impose specific restrictions.

In the present embodiment, the classification loss function configured to calculate the classification loss corresponding to the object type i could be represented as:

$$Loss_{cls-i} = \begin{cases} -\beta \times \delta_i \times (1-p)^2 \times \log(p) & IoU(gt_i = 1, \text{anchor}-i) \geq \varepsilon \\ -(1-\beta) \times (p)^2 \times \log(1-p) & IoU(gt_i = 1, \text{anchor}-i) < (\varepsilon - \Delta\varepsilon) \end{cases}$$

It should be noted that the present disclosure is not limited to the above formula. In the above mathematic formula, p is a confidence level, which represents the degree of certainty of regarding whether the object annotated in the annotation box of the object type i is the object type i (each annotation box has a corresponding confidence level) by the object detection model 10, and is a real number, not smaller than 0 and not greater than 1, outputted by the object detection model 10; β represents a first parameter, which corresponds to a penalty mark when the annotation box of the object type i in the output image box-selects an object which should be determined as the object type i, and is a positive real number; (1−β) corresponds to a penalty mark when the annotation box of the object type i does not box-select the object which should be determined as the object type i; ε is a second parameter, which represents a threshold value for determining whether the annotation box of the object type i in the output image box-selects an object belonging to the object type 1, and is a positive real number; Δε represents a tolerance value and is a positive real number; $\delta_i$ is a third parameter, which corresponds to a mark weighted value determined according to whether the annotation box of the object type i in the output image box-selects an object not belonging to the object type i; IoU(a, b) represents an intersection of the union sets a and b; $gt_i$=1 represents the annotation box of the object type i in the solution image IMG-sol; and anchor−i represents the annotation box of the object type i in the output image IMG-out. The meaning of the above formula is: if the intersection of the union of the annotation boxes of the object type i in the solution image IMG-so and the union of the annotation boxes of the object type i in the output image IMG-out is greater than or equivalent to E, the intersection of the union sets is determined as a positive sample, and the classification loss function: $-\beta \times \delta_i \times (1-p)^2 \times \log(p)$ is used; if the intersection of the union of the annotation boxes of the object type i in the solution image IMG-sol and the union of the annotation boxes of the object type i in the output image IMG-out is smaller than (ε−Δε), the intersection of the union sets is determined as a negative sample, and the classification loss function $-(1-\beta)\times\delta_i\times(p)^2\times\log(1-p)$ is used; if the intersection of the union of the annotation boxes of the object type i in the solution image IMG-sol and the union of the annotation boxes of the object type i in the output image IMG-out is greater than (ε−Δε) but smaller than ε, the intersection of the union sets is determined as a sample excluded from calculation.

The above positive sample refers to the object belonging to the object type i which is the detection target of the object detection model 10; the negative sample refers to the objects or background not belonging to the object type i which is the detection target of the object detection model 10 (that is, normal vessels and muscles other than the to-be-detected tissue of the symptom).

The third parameter $\delta_i$ is represented as:

$$\delta_i = \begin{cases} \prod_{m=i,n=1}^{n=L} w_{mn} & IoU(gt_n=1, \text{anchor}-i) \geq \varepsilon \\ 1 & \text{otherwise} \end{cases}$$

Wherein, $w_{mn}$ represents a weight matrix, which records a number of weights when incorrect annotations occur between the object types; $gt_n=1$ represents the annotation box corresponding to the object type n in the solution image. If the intersection of the union of the annotation boxes of the object type i in the solution image IMG-sol and the union of the annotation boxes of the object type n is greater than or equivalent to E, the mark weighted value is calculated according to $\prod_{m=i,n=1}^{n=L} w_{mn}$. To make it easier to understand, an actual example is disclosed below for reference.

In an embodiment, the number of object types L is 4, and the 4 object types are first symptom Le1, second symptom Le2, third symptom Le3 and fourth symptom Le4. The weight matrix is represented as:

$$w_{mn} = \begin{bmatrix} 1 & 1 & 1 & 1.3 \\ 1 & 1 & 1.2 & 1 \\ 1 & 1.2 & 1 & 1.1 \\ 12 & 1 & 1 & 1 \end{bmatrix}$$

For the convenience of explanation, the weight matrix is explained below with a table.

annotation box of the object type Le1 in the output image box-selects the first symptom, the second symptom or the fourth symptom as determined in the solution image, $\delta_{Le1}$ is equivalent to 1*1*1.3. That is, when the object detection model 10 box-selects the object determined as the fourth symptom in the solution image with the annotation box, which annotates the object type as the first symptom Le1, the penalty mark will be increased. Thus, the learning of the object detection model 10 regarding incorrect determination of some specific symptoms could be enhanced. That is, when the weight matrix is introduced to the calculation of the classification loss, the negative influence caused by problem (4), that is, similar symptoms may vary from person to person, in the training stage could be reduced. Through suitable design of the element values of the weight matrix, the trained object detection model 10 could classify similar symptoms more accurately.

It should be noted that the third parameter could be calculated by using a weight matrix or obtained by looking up table. For example, the weight matrix could be replaced by a weight table similar to Table 1, such that when calculating the third parameter, necessary weights could be obtained from corresponding columns of the table.

The second parameter ε could be determined according to the difference between the annotation boxes and the objects (or ideal annotation boxes) in the set of entire solution images (including the solution image and other solution images). For example, the second parameter ε could be adjusted according to the intersection of the annotation boxes and the objects (or ideal annotation box) in the set of entire solution images. In existing technologies, the value of the second parameter ε is normally set to 0.5, and the value of the tolerance value Δε is normally not set, that is, Δε=0. In the present embodiment, the value of the second parameter ε is decreased, such that the training system of object detection model could be adapted to a lower ratio of negative samples to positive samples. For example, the value of ε is decreased to 0.4, such that the threshold for determining whether the annotation box annotated by the object detection model 10 is correct could be lowered. Moreover, by introducing the tolerance value Δε, for example, the value of Δε is set to 0.1, bad samples could be excluded. Through the setting of the value of the second parameter and the tolerance value, the negative influence caused by problem (1), incorrect annotations, and problem (2), displacement of annotation boxes, in the training stage could be effectively reduced.

Since the solution image may have un-annotated positive samples, in the present embodiment, the value of the first parameter β is increased (for example, the value of the first parameter β is set to 0.75) to enhance the learning of positive samples. For example, the penalty mark when the object

TABLE 1

| Annotations of output image | Annotations of solution image | | | |
| --- | --- | --- | --- | --- |
| | Le1 | Le2 | Le3 | Le4 |
| Le1 | 1 (the weight when the annotation box annotated as Le1 in the output image actually box-selects the first symptom) | 1 (the weight when the annotation box annotated as Le1 in the output image box-selects the second symptom, that is, incorrect annotation) | 1 (the weight when the annotation box annotated as Le1 in the output image box-selects the third symptom, that is, incorrect annotation) | 1.3 (the weight when the annotation box annotated as Le1 in the output image box-selects the fourth symptom, that is, incorrect annotation) |
| Le2 | 1 | 1 | 1.2 | 1 |
| Le3 | 1 | 1.2 | 1 | 1.1 |
| Le4 | 1.2 | 1 | 1 | 1 |

The weight of the object type Le1 in the output image is calculated, according to the content of the object type Le1 box-selected in the output image. For example, when the detection model 10 annotates a positive sample is higher than that when the object detection model 10 does not annotate the positive sample. Thus, the object detection model 10 will be encouraged to annotate positive samples, and the negative influence caused by problem (3), missing annotations, in the training stage could be effectively reduced. The first parameter could be determined according to the ratio of annotated positive samples to un-annotated positive samples in the solution image and other solution images.

Figure 3:
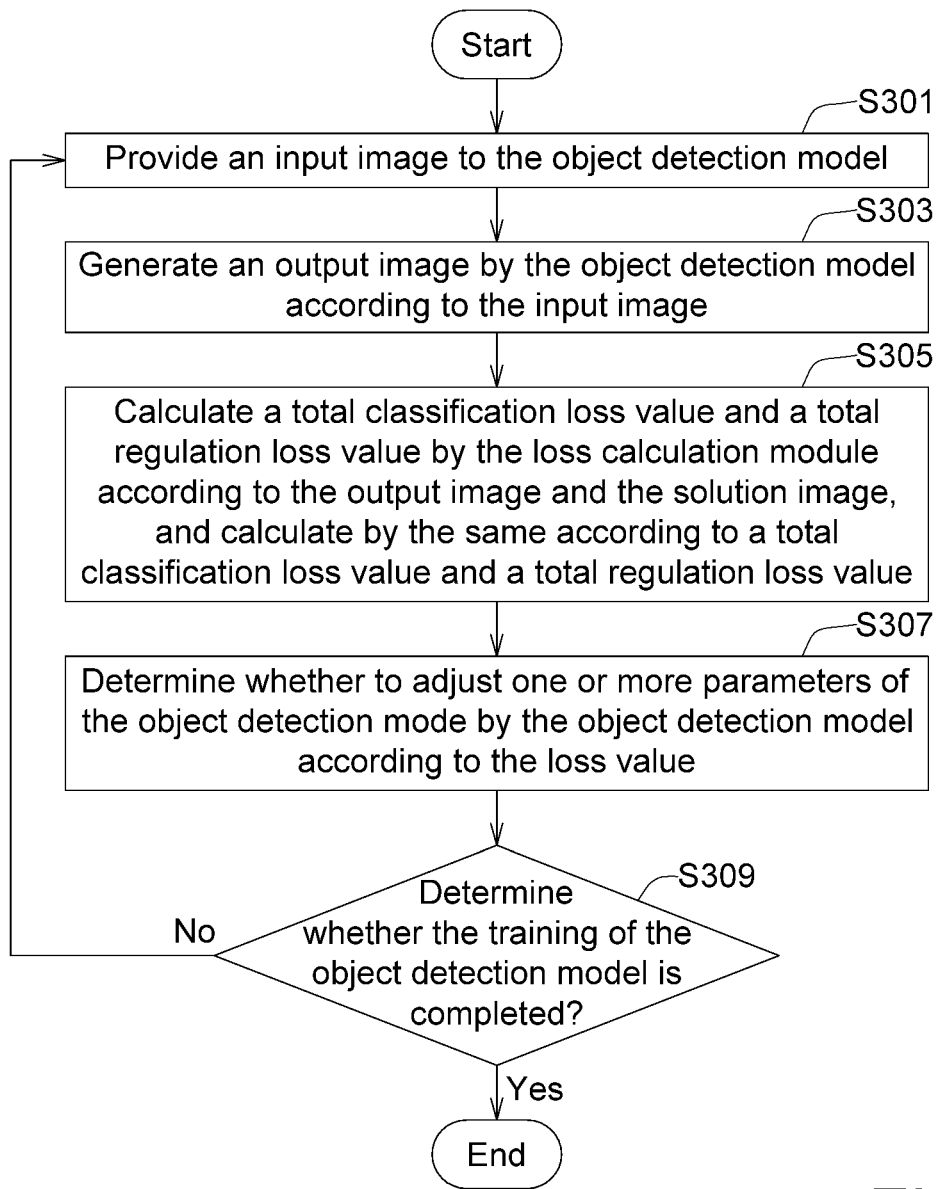
FIG. 3 is a flowchart of a training method for the training system of object detection model according to an embodiment of the present disclosure.

Referring to FIG. 3, a flowchart of a training method for the training system of object detection model according to an embodiment of the present disclosure is shown. The training method of FIG. 3 could be used in the training system 20 of FIG. 2.

S301, an input image is provided to the object detection model.

S303, an output image is generated by the object detection model according to the input image.

S305, a total classification loss value and a total regulation loss value are calculated by the loss calculation module according to the output image and the solution image, and a loss value is calculated by the same according to a total classification loss value and a total regulation loss value. The total classification loss value is a sum of a number of classification losses corresponding to a number of object types. The classification loss corresponding to each object type is calculated according to a first parameter, a second parameter and a third parameter. Details of the first parameter, the second parameter and the third parameter could be obtained with reference to above disclosure.

S307, whether to adjust one or more parameters of the object detection model is determined by the object detection model according to the loss value.

S309, whether the training of the object detection model is completed is determined. If the determination is positive, the method terminates; if the determination is negative, the method returns to S301.

Figure 4:
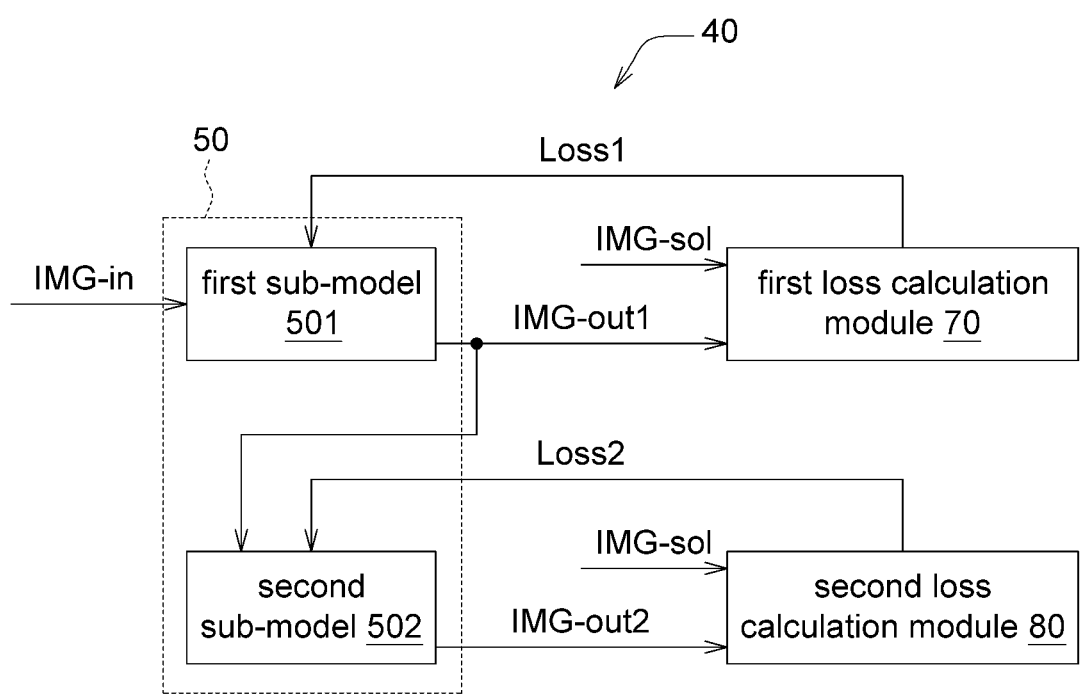
FIG. 4 is a block diagram of a training system of object detection model according to another embodiment of the present disclosure.

Referring to FIG. 4, a block diagram of a training system of object detection model according to another embodiment of the present disclosure is shown. The training system 40 includes an object detection model 50, a first loss calculation module 70 and a second loss calculation module 80.

The object detection model 50 includes a first sub-model 501 and a second sub-model 502. The object detection model 50 could be realized by a two-stage neural network architecture, and could implement an algorithm through a combination of computer readable instructions to detect and classify objects. The first sub-model 501 is configured to separate foreground and background, and could adopt various suitable or modified foreground-background separation models of existing technologies. The second sub-model 502 is configured to classify objects, and could adopt various suitable or modified object classification models of existing technologies.

The first sub-model 501 is configured to generate a first output image IMG-out1 according to an input image IMG-in. The input image IMG-in may include a number of objects, such as the objects not enclosed by annotation boxes in FIG. 1A, that is, original medical images. The second sub-model 502 is configured to output a second output image IMG-out2 according to the first output image IMG-out1.

The first loss calculation module 70, coupled to the first sub-model 501, is configured to calculate a first loss value Loss1 according to the first output image IMG-out1, the solution image IMG-sol and a first loss function, and transmit the first loss value Loss1 to the first sub-model 501.

The second loss calculation module 80, coupled to the second sub-model 502, is configured to calculate a second loss value Loss2 according to the second output image IMG-out2, the solution image IMG-sol and a second loss function, and transmit the second loss value Loss2 to the second sub-model 502.

The first loss value Loss1 could be calculated according to a first total classification loss value and a first total regulation loss value. The first loss function could be represented by a mathematic formula:

$$Loss1 = \sum_{i=1}^{L} Loss1_{cls-i} + \sum_{i=1}^{L} Loss1_{reg-i},$$

wherein Loss1 represents a first loss value; $Loss1_{cls-i}$ represents a first classification loss corresponding to the object type i; $Loss1_{reg-i}$ represents a first regulation loss corresponding to the object type i; and L represents the number of object types. That is, the first total classification loss value is obtained by adding up the first classification loss of all object type; and the first total regulation loss value is obtained by adding up the first regulation loss of all object types. The first total classification loss value represents the degree of difference between the object types of the annotated objects in the first output image IMG-out1 and the solution image IMG-sol. The first total regulation loss value represents the degree of difference between the locations and the sizes of the annotation boxes included in the first output image IMG-out1 and the solution image IMG-sol. The present disclosure mainly improves the method for calculating the first classification loss. The regulation loss could be calculated according to any available functions, such as usable functions of existing technologies, and the present disclosure does not impose specific restrictions.

In the present embodiment, the first classification loss function configured to calculate the first classification loss corresponding to the object type i could be represented as:

$$Loss1_{cls-i} = \begin{cases} -\beta \times (1-p)^2 \times \log(p) & IoU(gt_i = 1, anchor1 - i) \geq \varepsilon \\ -(1-\beta) \times (p)^2 \times \log(1-p) & IoU(gt_i = 1, anchor1 - i) < (\varepsilon - \Delta\varepsilon) \end{cases}$$

It should be noted that the present disclosure is not limited to the above formula. In the above mathematic formula, anchor1−i represents the annotation box in the first output image IMG-out1 configured to annotate the object type i. Remaining parameters could be obtained with reference to above disclosure.

The second loss value Loss2 could be calculated according to a second total classification loss value and a second total regulation loss value. The second loss function could be mathematically represented as: $Loss2 = \sum_{i=1}^{L} Loss1_{cls-i} + \sum_{i=1}^{L} Loss1_{reg-i}$, wherein Loss2 represents a second loss value; $Loss2_{cls-i}$ represents a second classification loss corresponding to the object type i; $Loss2_{reg-i}$ represents a second regulation loss corresponding to the object type i; and L represents the number of object types. That is; the second total classification loss value is obtained by adding up the second classification loss of all object types; and the second total regulation loss value is obtained by adding up the second regulation loss of all object types. The second total classification loss value represents the degree of difference between the object types of the annotated objects in the second output image IMG-out2 and the solution image IMG-sol. The second total regulation loss value represents the degree of difference between the locations and the sizes of the annotation boxes included in the second output image IMG-out2 and the solution image IMG-sol. The present disclosure mainly improves the method for calculating the second classification loss. The regulation loss could be calculated according to any available functions, such as usable functions of existing technologies, and the present disclosure does not impose specific restrictions.

In the present embodiment, the second classification loss function configured to calculate the second classification loss corresponding to the object type I could be represented as:

$$Loss2_{cls\text{-}i} = \begin{cases} \delta_i \times (1-p)^2 \times \log(p) & IoU(gt_i = 1, anchor2 - i) \geq \varepsilon 1 \\ \delta_i \times (p)^2 \times \log(1-p) & IoU(gt_i = 1, anchor2 - i) < \varepsilon 2 \end{cases}$$

The present disclosure is not limited to the above formula. In the above mathematic formula, anchor2–i represents the annotation box in the first output image IMG-out1 configured to annotate the object type i. In the present embodiment, ε1 is equivalent to ε, ε2 is equivalent to ε–Δε, and remaining parameters could be obtained with reference to above disclosure.

In the present embodiment, the first loss calculation module 70 calculates the second loss value according to the first parameter and the second parameter, and the second loss calculation module 80 calculates the second loss value according to the second parameter and the third parameter. In other words, the first loss calculation module 70 could reduce the negative influence caused by problem (1), incorrect annotations, problem, (2), displacement of annotation boxes, and problem (3), missing annotations, in the training stage, and the second loss calculation module 80 could reduce the negative influence caused by problem (4), similar symptoms may vary from person to person, in the training stage.

It should be noted that in an alternate embodiment, ε1 is equivalent to ε, ε2 is equivalent to ε. In another alternate embodiment, ε1 could be not equivalent to ε, and ε2 is equivalent to ε1. That is, since the second loss calculation module 80 mainly trains the second sub-model 502 to recognize similar symptoms, the standard for determining a sample as a positive sample by the second loss calculation module 80 could be different from the standard for determining a sample as a positive sample by the first loss calculation module 70.

Figure 5:
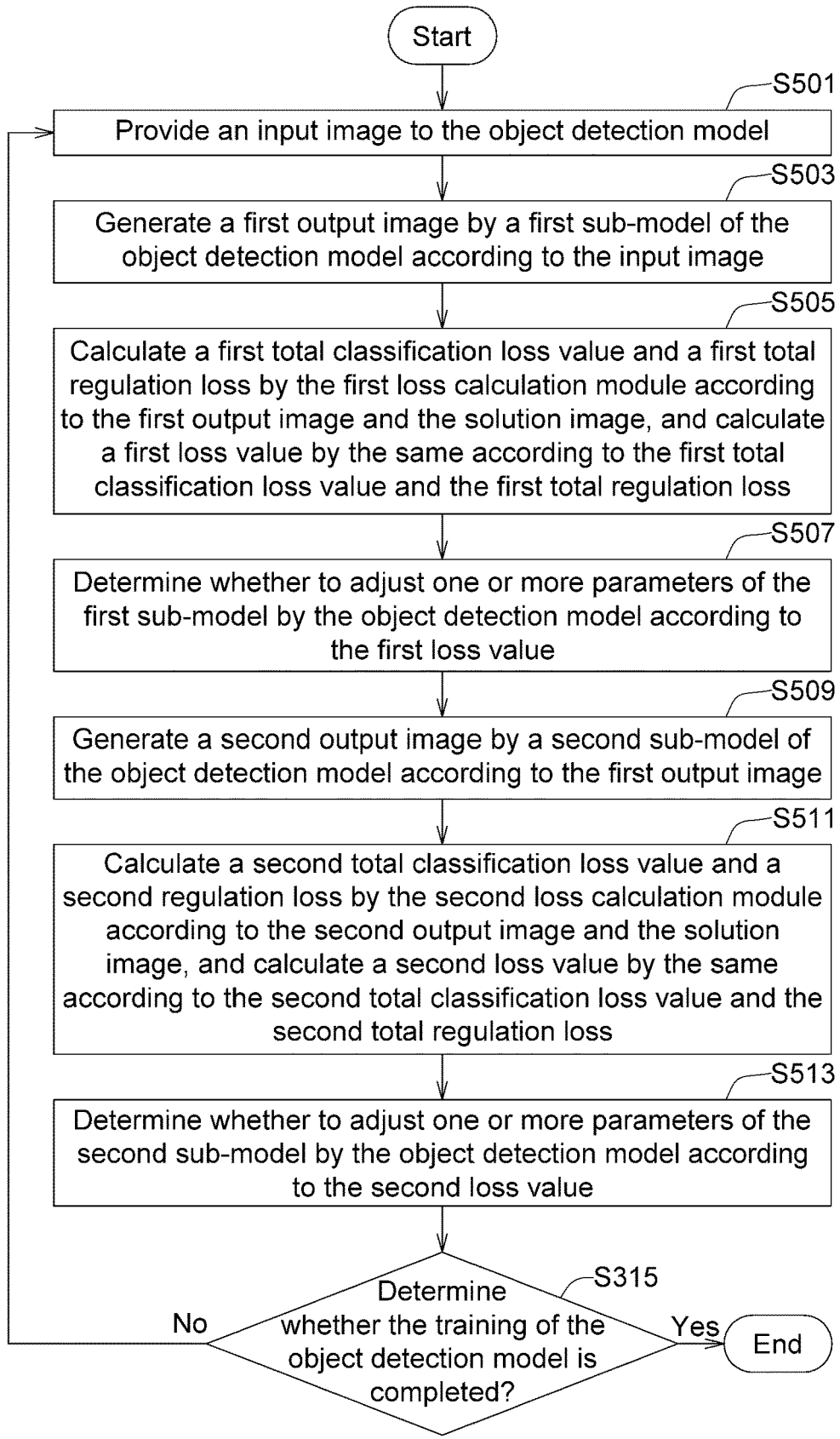
FIG. 5 is a flowchart of a training method for the training system of object detection model according to another embodiment of the present disclosure.

Referring to FIG. 5, a flowchart of a training method for the training system of object detection model according to another embodiment of the present disclosure is shown. The training method of FIG. 5 could be used in the training system 40 of FIG. 4.

In S501, an input image is provided to the object detection model.

In S503, a first output image is generated by a first sub-model of the object detection model according to the input image.

In S505, a first total classification loss value and a first total regulation loss are calculated by the first loss calculation module according to the first output image and the solution image, and a first loss value is calculated by the same according to the first total classification loss value and the first total regulation loss. The first total classification loss value is a sum of a number of first classification losses corresponding to a number of object types. The first classification loss corresponding to each object type is calculated according to a first parameter and a second parameter. Details of the first parameter and the second parameter could be obtained with reference to above disclosure.

In S507, whether to adjust one or more parameters of the first sub-model is determined by the object detection model according to the first loss value.

In S509, a second output image is generated by a second sub-model of the object detection model according to the first output image.

In S511, a second total classification loss value and a second regulation loss are calculated by the second loss calculation module according to the second output image and the solution image, and a second loss value is calculated by the same according to the second total classification loss value and the second total regulation loss. The second total classification loss value is a sum of a number of second classification losses corresponding to a number of object types. The second classification loss corresponding to each object type is calculated according to a third parameter. Details of the third parameter could be obtained with reference to above disclosure.

In S513, whether to adjust one or more parameters of the second sub-model is determined by the object detection model according to the second loss value.

In S515, whether the training of the object detection model is completed is determined. If the determination is positive, the method terminates; if the determination is negative, the method returns to S501.

The training system and the training method disclosed in the present disclosure could be adapted to the feature of the solution image of various fields that cannot be modified or is not suitable for modification. For example, in the medical field, under the premise that the annotations provided in the solution image by professional doctors are not changed, the present disclosure could effectively reduce the negative influence caused by problem (1), incorrect annotations, problem (2), displacement of annotation boxes, problem (3), missing annotations, and problem (4), similar symptoms may vary from person to person, in the training stage by relaxing the conditions for learning positive samples of the symptoms, enhancing the training of positive samples of the symptoms, and separating the regions of similar symptoms.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A training system of object detection model, comprising:
    an object detection model configured to generate an output image according to an input image; and
    a loss calculation module coupled to the object detection model and configured to calculate a total classification loss value according to the output image and a solution image, calculate a loss value according to the total classification loss value, and transmit the loss value to the object detection model,
    wherein the total classification loss value is calculated according to a plurality of classification losses corresponding to a plurality of object types; each of the classification losses corresponding to each of the object types is calculated according to a first parameter, a second parameter and a third parameter; the first parameter corresponds to a penalty mark determined according to whether one or more annotation boxes belonging to an object type in the output image box-select one or more objects which should be determined as the object type; the second parameter corresponds to a threshold value for determining whether the one or more annotation boxes belonging to the object type in the output image box-select one or more objects belonging to the object type; and the third parameter corresponds to a mark weighted value determined according to whether the one or more annotation boxes belonging to the object type in the output image box-select one or more objects not belonging to the object type.

2. The training system according to claim 1, wherein the third parameter is calculated according to a weight matrix or is obtained by looking up a weight table; and the weight matrix and the weight table are formed of a plurality of weights configured to record incorrect annotations between the object types.

3. The training system according to claim 1, wherein the second parameter is determined according to a difference between a plurality of annotation boxes in the solution image and a plurality of first solution images and a plurality of objects in the solution image and a plurality of first solution images; or, the second parameter is determined according to the difference between a plurality of annotation boxes in the solution image and a plurality of first solution images and a plurality of ideal annotation boxes in the solution image and a plurality of first solution images.

4. The training system according to claim 3, wherein each classification loss corresponding to each object type is further calculated according to a tolerance value, which corresponds to one or more annotation boxes belonging to the object type but excluded from calculation in the output image.

5. The training system according to claim 1, wherein the first parameter is determined according to a ratio of a plurality of annotated positive samples to a plurality of un-annotated positive samples in the solution image and a plurality of first solution images.

6. A training method of object detection model, comprising:
providing an input image to the object detection model, such that the object detection model is enabled to generate an output image according to the input image;
calculating a total classification loss value by a loss calculation module according to the output image and a solution image;
calculating a loss value by the loss calculation module according to the total classification loss value; and
transmitting the loss value to the object detection model by the loss calculation module,
wherein the total classification loss value is calculated according to a plurality of classification losses corresponding to a plurality of object types; each of the classification losses corresponding to each object type is calculated according to a first parameter, a second parameter and a third parameter; the first parameter corresponds to a penalty mark determined according to whether one or more annotation boxes belonging to the object type in the output image box-select one or more objects which should be determined as the object type; the second parameter corresponds to a threshold value for determining whether the one or more annotation boxes belonging to the object type in the output image box-select one or more objects belonging to the object type; and the third parameter corresponds to a mark weighted value determined according to whether the one or more annotation boxes belonging to an object type in the output image box-select one or more objects not belonging to the object type.

7. The training method according to claim 6, wherein the third parameter is calculated according to a weight matrix or is obtained by looking up a weight table; and the weight matrix and the weight table are formed of a plurality of weights configured to record incorrect annotations between the object types.

8. The training method according to claim 6, wherein the second parameter is determined according to a difference between a plurality of annotation boxes in the solution image and a plurality of first solution images and a plurality of objects in the solution image and a plurality of first solution images; or, the second parameter is determined according to a difference between a plurality of annotation boxes in the solution image and a plurality of first solution images and a plurality of ideal annotation boxes in the solution image and a plurality of first solution images.

9. The training method according to claim 8, wherein each classification loss corresponding to each object type is further calculated according to a tolerance value, which corresponds to one or more annotation boxes belonging to the object type but excluded from calculation in the output image.

10. The training method according to claim 6, wherein the first parameter is determined according to a ratio of a plurality of annotated positive samples to a plurality of un-annotated positive samples in the solution image and a plurality of first solution images.

11. A training system of object detection model, comprising:
an object detection model, comprising a first sub-model and a second sub-model, wherein the first sub-model is configured to generate a first output image according to an input image; and the second sub-model is configured to generate a second output image according to the first output image;
a first loss calculation module coupled to the first sub-model and configured to calculate a first total classification loss value according to the first output image and a solution image, calculate a first loss value according to the first total classification loss value, and transmit the first loss value to the first sub-model; and
a second loss calculation module coupled to the second sub-model and configured to calculate a second total classification loss value according to the second output image and the solution image, calculate a second loss value according to the second total classification loss value, and transmit the second loss value to the second sub-model,
wherein the first total classification loss value is calculated according to a plurality of first classification losses corresponding to a plurality of object types; each of the first classification losses corresponding to each object type is calculated according to a first parameter and a second parameter; the second total classification loss value is calculated according to a plurality of second classification losses corresponding to the object types; each of the second classification losses corresponding to each object type is calculated according to a third parameter; the first parameter corresponds to a penalty mark determined according to whether one or more annotation boxes belonging to an object type in the first output image box-select one or more objects which should be determined as the object type; the second parameter corresponds to a threshold value for determining whether the one or more annotation boxes belonging to the object type in the first output image box-select one or more objects belonging to the object type; and the third parameter corresponds to a mark weighted value determined according to whether the one or more annotation boxes belonging to the object type in the second output image box-select one or more objects not belonging to the object type.

12. The training system according to claim 11, wherein the third parameter is calculated according to a weight matrix or is obtained by looking up a weight table; and the weight matrix and the weight table are formed of a plurality of weights configured to record incorrect annotations between the object types.

13. The training system according to claim 11, wherein the second parameter is determined according to a difference between a plurality of annotation boxes in the solution image and a plurality of first solution images and a plurality of objects in the solution image and a plurality of first solution images; or, the second parameter is determined according to a difference between a plurality of annotation boxes in the solution image and a plurality of first solution images and a plurality of ideal annotation boxes in the solution image and a plurality of first solution images.

14. The training system according to claim 13, wherein each of the first classification losses corresponding to each of the object types is further calculated according to a tolerance value, which corresponds to one or more annotation boxes belonging to the object type but excluded from calculation in the first output image.

15. The training system according to claim 11, wherein the first parameter is determined according to a ratio of a plurality of annotated positive samples to a plurality of un-annotated positive samples in the solution image and a plurality of first solution images.

16. A training method of object detection model, comprising:
providing a first sub-model an input image to the object detection model, such that the first sub-model is enabled to generate an output image according to the input image;
calculating a first total classification loss value by a first loss calculation module according to a first output image and a solution image;
calculating a first loss value by the first loss calculation module according to the first total classification loss value;
transmitting the first loss value to the first sub-model by the first loss calculation module;
generating a second output image by a second sub-model of the object detection model according to the first output image;
calculating a second total classification loss value by a second loss calculation module according to the second output image and the solution image;
calculating a second loss value by the second loss calculation module according to the second total classification loss value; and
transmitting the second loss value to the second sub-model by the second loss calculation module,
wherein the first total classification loss value is calculated according to a plurality of first classification losses corresponding to a plurality of object types; each of the first classification losses corresponding to each of the object types is calculated according to a first parameter and a second parameter; the second total classification loss value is calculated according to a plurality of second classification losses corresponding to the object types; each of the second classification losses corresponding to each object type is calculated according to a third parameter; the first parameter corresponds to a penalty mark determined according to whether one or more annotation boxes belonging to an object type in the first output image box-select one or more objects which should be determined as the object type; the second parameter corresponds to a threshold value for determining whether the one or more annotation boxes belonging to the object type in the first output image box-select one or more objects belonging to the object type; and the third parameter corresponds to a markweighted value determined according to whether the one or more annotation boxes belonging to the object type in the second output image box-select one or more objects not belonging to the object type.

17. The training method according to claim 16, wherein the third parameter is calculated according to a weight matrix or is obtained by looking up a weight table; and the weight matrix and the weight table are formed of a plurality of weights configured to record incorrect annotations between the object types.

18. The training method according to claim 16, wherein the second parameter is determined according to a difference between a plurality of annotation boxes in the solution image and a plurality of first solution images and a plurality of objects in the solution image and a plurality of first solution images; or, the second parameter is determined according to a difference between a plurality of annotation boxes in the solution image and a plurality of first solution images and a plurality of ideal annotation boxes in the solution image and a plurality of first solution images.

19. The training method according to claim 18, wherein each of the first classification losses corresponding to each object type is further calculated according to a tolerance value, which corresponds to one or more annotation boxes belonging to the object type but excluded from calculation in first the output image.

20. The training method according to claim 16, wherein the first parameter is determined according to a ratio of a plurality of annotated positive samples to a plurality of un-annotated positive samples in the solution image and a plurality of first solution images.

* * * * *